United States Patent
Escher et al.

(10) Patent No.: US 9,416,031 B2
(45) Date of Patent: Aug. 16, 2016

(54) DESALINATION SYSTEM AND METHOD FOR DESALINATION

(71) Applicants: International Business Machines Corporation, Armonk, NY (US); Egypt Nanotechnology Center (EGNC), Giza (EG)

(72) Inventors: Werner Escher, Rueschlikon (CH); Javier V. Goicochea, Rueschlikon (CH); Ahmed S. G. Khalil, Fayoum (EG); Bruno Michel, Rueschlikon (CH); Chin Lee Ong, Rueschlikon (CH); Stephan Paredes, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/415,425

(22) PCT Filed: Jul. 4, 2013

(86) PCT No.: PCT/IB2013/055487
§ 371 (c)(1),
(2) Date: Jan. 16, 2015

(87) PCT Pub. No.: WO2014/020461
PCT Pub. Date: Feb. 6, 2014

(65) Prior Publication Data
US 2015/0166371 A1      Jun. 18, 2015

(30) Foreign Application Priority Data

Jul. 31, 2012   (GB) .................................. 1213579.4

(51) Int. Cl.
*B01D 3/00*       (2006.01)
*B01D 35/18*      (2006.01)
(Continued)

(52) U.S. Cl.
CPC .............. *C02F 1/447* (2013.01); *B01D 61/364* (2013.01); *C02F 1/14* (2013.01); *C02F 2103/08* (2013.01)

(58) Field of Classification Search
CPC .... C07C 31/08; B01D 2311/04; B01D 5/006; B01D 61/364; B01D 3/007
USPC ..................................................... 210/175, 640
See application file for complete search history.

(56) References Cited

U.S. PATENT DOCUMENTS 4,962,270 A * 10/1990 Feimer ................. B01D 61/362
                                                                     208/308
5,102,550 A      4/1992 Pizzino et al.
(Continued)

FOREIGN PATENT DOCUMENTS

| CN | 1283167 A | 2/2001 |
|---|---|---|
| CN | 1352573 A | 6/2002 |
| CN | 1502560 A | 6/2004 |

OTHER PUBLICATIONS

A. Criscuoli et al., "Treatment of Dye Solutions by Vacuum Membrane Distillation," Water Research, Dec. 2008, pp. 5031-5037, vol. 42, No. 20.
(Continued)

*Primary Examiner* — Ana Fortuna
(74) *Attorney, Agent, or Firm* — Keivan Razavi; Ryan, Mason & Lewis, LLP (57) ABSTRACT

A desalination system (1) for producing a distillate from a feed liquid includes: a steam raising device (2) having a liquid section (5) and a steam section (6) which are separated by a membrane system (7); a membrane distillation device (3) having a first steam section (11) and a liquid section (12) which are separated by a wall (14) and having a second steam section (13) which is separated from the liquid section (12) by a membrane system (15); and a heat exchange device (4) having a first liquid section (21) and a second liquid section (22), which are separated by a wall (23).

18 Claims, 4 Drawing Sheets

(51) Int. Cl.

*B01D 15/00* (2006.01)
*C02F 1/44* (2006.01)
*C02F 1/02* (2006.01)
*B01D 63/00* (2006.01)
*B01D 61/36* (2006.01)
*C02F 1/14* (2006.01)
*C02F 103/08* (2006.01)

(56) References Cited

U.S. PATENT DOCUMENTS

| | | | |
|---|---|---|---|
| 6,508,936 B1 | 1/2003 | Hassan | |
| 6,716,355 B1 | 4/2004 | Hanemaaijer et al. | |
| 6,833,056 B1 | 12/2004 | Kamiya et al. | |
| 7,459,084 B2 | 12/2008 | Baig et al. | |
| 7,608,188 B2 | 10/2009 | Cath et al. | |
| 8,029,671 B2 | 10/2011 | Cath et al. | |
| 8,029,675 B2 * | 10/2011 | Heinzl | B01D 63/10 202/160 |
| 8,083,942 B2 | 12/2011 | Cath et al. | |
| 2004/0219400 A1 | 11/2004 | Al-Hallaj et al. | |
| 2009/0000939 A1 * | 1/2009 | Heinzl | B01D 63/10 203/80 |
| 2010/0072135 A1 * | 3/2010 | Hanemaaijer | B01D 1/0035 210/640 |
| 2010/0282676 A1 | 11/2010 | Liberman et al. | |
| 2011/0272354 A1 | 11/2011 | Mitra et al. | |
| 2011/0309016 A1 | 12/2011 | Duke | |
| 2012/0048803 A1 | 3/2012 | Shapiro | |
| 2015/0166371 A1 * | 6/2015 | Escher | B01D 61/364 210/640 |

OTHER PUBLICATIONS

K.W. Lawson et al., "Membrane Distillation," Journal of Membrane Science, Feb. 1997, pp. 1-25, vol. 124, No. 1.

* cited by examiner

DESALINATION SYSTEM AND METHOD FOR DESALINATION

FIELD

This disclosure relates to a desalination system and a method for operating the desalination system or a method for desalination. The disclosure in particular relates to fluid separation techniques and the purification of liquids.

BACKGROUND

Fluid separation techniques are, for example, applied for brackish or seawater desalination. In order to obtain potable water, for example, membrane-assisted distillation techniques are conventionally used. Known membrane-assisted techniques include reverse osmosis, electrodialysis or membrane distillation. In membrane distillation processes, phase change of the liquid feed takes place at the surface of a hydrophobic membrane. The membrane is a barrier for the liquid phase of the feed water, but permeable for the vapor phase, for example water vapor. The driving force of the process is given by a partial vapor pressure difference, for example by applying a temperature difference or gradient between the two sizes of membrane. Due to the temperature difference and the phase change, considerable thermal energy has to be employed for the operation of a membrane distillation process.

For example, US 2009/0000939 A1 discloses a membrane distillation process in which a liquid to be concentrated is separated from the vapor space by a vapor-permeable but liquid or water-impermeable membrane. In this method, a negative pressure is imparted to the liquid to be concentrated so that the absolute pressure is reduced to or below its boiling vapor pressure corresponding to the temperature. The corresponding membrane distillation device has several stages including condenser modules.

Because membrane distillation processes and devices are less efficient than other desalination processes, it is desirable to reduce their total thermal energy consumption, when operating such a membrane desalination system.

SUMMARY

It is an aspect of the present disclosure to provide for a system for desalinating or purifying a liquid, such as brackish or seawater into potable or drinking water.

It is another aspect of the present disclosure to provide for a method for operating a desalination system.

According to an embodiment of a first aspect of the invention a desalination system for producing a distillate from a feed liquid comprises:
  a steam raising device having a liquid section and a steam section which are separated by a membrane system;
  a membrane distillation device having a first steam/vapor section and a liquid section which are separated by a wall, and having a second steam section which is separated from the liquid section by a membrane system; and
  a heat exchange device having a first liquid section and a second liquid section which are separated by a wall. The steam raising device, the membrane distillation device and the heat exchange device are implemented such that feed liquid fed into the second liquid section of the heat exchange device is heated by a brine liquid from the liquid section of the steam raising device, and such that permeate from the steam section of the steam raising device is condensed in the first steam/vapor section of the membrane distillation device, thereby heating heated feed liquid from the heat exchange device, in particular reheating the preheated boiling feed liquid from the heat exchange device.

A desalination system for producing a distillate from a feed liquid may comprise:
  a steam raising device having a liquid section with an inlet and an outlet and the steam section with an outlet wherein the liquid section and the steam section are separated by a preferably hydrophobic membrane system;
  a membrane distillation device having a first steam section with an inlet and an outlet, a liquid section with an inlet and an outlet and the second steam section with an outlet wherein the liquid section and the second steam section are separated by a membrane system and the first steam section and the liquid section are separated by a wall;
  a heat exchange device having a first liquid section with an inlet and an outlet and a second liquid section with an inlet and an outlet wherein the first liquid section and the liquid section are separated by a wall.

The steam raising, the membrane distillation device and the heat exchange device are implemented such that feed liquid fed into the second liquid section of this heat exchange device is preheated by brine liquid from the liquid section of the steam raising device potentially inducing flow boiling of the liquid feed, and such that permeate from the steam section of the steam raising device is condensed in the first steam section of the membrane distillation device thereby reheating the preheated boiling feed liquid from the heat exchange device.

According to an embodiment of a second aspect of the invention a method for operating a desalination system for producing a distillate from a feed liquid is disclosed. The operated desalination system comprises:
  a steam raising device having a liquid section and a steam section which are separated by preferably hydrophobic membrane systems;
  a membrane distillation device having a first steam section and a liquid section which are separated by a wall and having a second steam section which is separated from the liquid section by a preferably hydrophobic membrane system; and
  a heat exchange device having a first liquid section and a second liquid section which are separated by a wall.

The method comprises the steps of:
  feeding feed liquid into the second liquid section of the heat exchange device;
  heating the feed liquid by heat exchange from the concentrated brine liquid from the liquid section of the steam raising device; and
    condensing permeate from the steam section of the steam raising device and the first steam section of the membrane distillation device thereby reheating the heated feed liquid from the heat exchange device, in particular flow boiling feed liquid from the heat exchange device.

Embodiments of the desalination system and/or method for operating such include a heat recovery, for example by transferring heat from concentrated stream, i.e. brine liquid, to fresh feed liquid that is inserted to the membrane distillation device or module. Further, permeate, in particular in its gaseous phase, is cooled and condensed by transferring heat to the liquid feed. As a result, a high energy efficiency of a desalination system is obtained by the recovery of latent heat. The desalination system can be operated at a temperature where the distillate is pasteurized and therefore relatively germ-free. The desalination system can be used to remove or separate colloidal or dissolved matter from an aqueous feed solution or mixture employing a low-grade heat source. For example, solar thermal energy can be used to heat the feed liquid.

In embodiments, the thermal energy released by the condensing vapor in the steam/vapor section may induce boiling of liquid feed in liquid section, thus generating extra water vapor for extraction into steam/vapor section of membrane distillation device.

In embodiments, the desalination system further comprises a heating device for providing heated feed liquid from the liquid section of the membrane distillation device to the liquid section of the steam raising device.

For example, the heating device may be a solar heating device. In embodiments, the feed liquid is heated to a temperature between 60 and 80° C. by the heating device. In embodiments the temperature can be between 60 and 70° C. A heating device may comprise a heat exchanger.

In embodiments of the desalination system, the desalination system further comprises a modified compressor or vacuum pumping device for generating a pressure difference between liquid phase portions and gaseous phase portions in the desalination system such that a phase change from the liquid phase to the gaseous phase occurs at the membranes. For example, the pressure and temperature parameters are adapted such that an evaporation of the feed liquid occurs at the membrane surface pores under sub-atmospheric conditions. For example, the operating temperature at the liquid phase at the liquid feed side of the membrane surface is in the range of between 60 and 70° C. The pressure in the permeate chambers can be maintained below 0.5 bar or even less than 0.3 bar for more efficient water recovery. The operation parameters allow for a low-grade heat source, such as solar heat or low-grade waste heat for bringing the temperature of the feed liquid to the specified range. With efficient heat recovery and heat reuse increases the energetic efficiency of the desalination system.

In embodiments, the desalination system is implemented to carry out a vacuum membrane distillation process. In a vacuum membrane distillation process, pure water vapor diffuses through the membranes, while salt ions are withheld by the membranes. Water vapor is channeled out of the permeate chambers to be condensed internally or externally, for example in the membrane distillation device or module or a specific condenser device in the distillate tank. For example, a) vapor extraction in the boiling feed from the heat exchanger-boiler module occurs in the membrane distillation module by the vapor diffusion process through the membranes into the permeate chambers for external condensation on a condensing device in the distillate tank and b) water vapor from the steam raising module's permeate chamber is diverted into the membrane distillation module to undergo internal condensation in the membrane distillation's first steam section (condensation chamber) to produce distillate. Latent heat of condensation released from the condensing vapor is used to reheat the saturated liquid feed in the membrane distillation module resulting in the additional generation of water vapor and undergoing similar vapor extraction process as stipulated in (a).

In embodiments of the system and the method, the distillate is tapped at an outlet of the first steam section of the membrane distillation device and water vapor at an outlet of the second steam section of the membrane distillation device. For example, the water vapor from the second steam section of the membrane distillation device can be condensed in a reservoir/tank heat exchange device and stored in a reservoir or tank.

In embodiments of the desalination system, there is a second heat exchange device for transferring heat from brine liquid from the first liquid section of the heat exchange device to feed liquid fed into the second liquid section of the heat exchange device. The second heat exchange device leads to a preheating of raw liquid feed, therefore additional energy efficiency is established.

In embodiments, the desalination system may further comprise a third heat exchange device for heat recovery from the distillate from the first and second steam section of the membrane distillation device and for the heating feed liquid to be fed into the second liquid section of the heat exchange device. The relatively hot distillate that is, for example, at least partially in a gaseous phase or vapor phase is cooled down in a cold heat exchanger that may also include a demister. At the same time, ambient temperature feed liquid is warmed up in the third heat exchange device.

Embodiments of the desalination system further comprise a pumping device for delivering feed liquid from the second liquid section of the membrane distillation device to the liquid section of the steam raising device. The pump device may reduce the pressure in the feed loop and allows for a simpler cost-effective implementation of the desalination system's elements.

In embodiments, the desalination system is implemented such that the feed liquid, permeate, distillate and brine essentially flow in a closed circuit coupled to the atmosphere by a brine discharge valve and a throttle valve. For example, by sealing the liquid flow system, a stable desalination process having appropriate pressure differences and temperatures can be achieved. The brine discharge and vacuum throttle valve may decouple the desalination system from atmospheric pressure during a distillation operation.

In embodiments of the system, the desalination system is implemented such that the feed liquid boils at least partially in the second liquid section of the heat exchange device and/or the liquid section of the membrane distillation device. For example, the temperature and pressure parameters are adjusted such that the feed liquid is close to its boiling point in the heat exchanger device and the membrane distillation device.

In embodiments, the membrane systems comprise a flat rectangular-shaped membrane. In contrast to irregular shapes or fiber-based membranes or wound structures, flat membranes can be easily handled and produced.

In embodiments, at least one membrane system comprises at least two flat membranes spaced from each other. If, for example, one membrane is damaged, still a fail-safe system due to the second spare membrane is available. The two flat membranes forming the membrane system can also be attached to each other.

In embodiments, at least one membrane system comprises a membrane held by a support frame. For example, the support frame can be placed into guiding rails at a body or housing of the membrane distillation device or guiding rails at housing a body of the steam raising device. For example, the guiding rails can form slots for framed membranes. The membranes can then easily be exchanged or additional membranes can be inserted into the membrane distillation or steam raising device in order to increase their efficiency or potential throughput of feed liquid to be purified.

In embodiments, the steam sections and liquid sections are essentially box-like chambers. Rectangular box or block-like chambers use the available space efficiently and can be extended in a modular fashion by additional chambers. Hence, a respective desalination system is especially flexible and scalable.

In embodiments of the desalination system, the membrane distillation device is arranged such that a permeate or distillate is discharged by gravity. For example, the longitudinal extensions of the respective steam sections are arranged in parallel with gravity.

In embodiments, the second liquid section of the heat exchanger device is communicatively coupled to the first liquid section of the heat exchanger device through a conduit to the first liquid section of the heat exchanger device for re-circulating brine from the first liquid section of the heat exchanger device.

The system may be operated in terms of a cyclic operation where a vacuum pump or a modified compressor is stopped and the system is vented to deliver the distillate at ambient pressure.

In embodiments of the desalination system, the desalination system comprises a plurality of steam raising devices, membrane distillation devices and/or heat exchange devices. By attaching, for example, box-like devices to one another, a compact and easy-to-transport vacuum distillation system is realized.

Certain embodiments of the presented desalination system and the method for desalination may comprise individual or combined features, method steps or aspects as mentioned above or below with respect to exemplary embodiments.

BRIEF DESCRIPTION OF THE DRAWINGS

In the following, embodiments of methods and devices relating to the manufacture of fillings in a cavity are described with reference to the enclosed drawings.

Like or functionally like elements in the drawings have been allotted the same reference characters, if not otherwise indicated.

DETAILED DESCRIPTION

The term "liquid feed" refers to a fluid that is to be purified through a membrane distillation process. Generally, the liquid feed becomes more and more concentrated as pure parts translate the membrane and liquid feed enriched with the dispersed or dissolved agents remain in the "feed". Finally, heavily enriched brine liquid remains and is discarded.

As used herein, the term "brine" refers to a liquid portion that is circulated through a distillation process without being evaporated. The brine includes the concentrated solution of salt or other substances that need to be separated from the feed liquid.

The expression "vacuum membrane distillation" refers to a process where a liquid is evaporated at a membrane surface, wherein a trans-membrane pressure gradient appears across the membrane. The purification process may occur under partial vacuum conditions where the water vapor is extracted downstream from the membrane to be eventually condensed by an element that is separate from the membrane. The expression "vacuum" refers to a pressure below ambient pressure or a pressure difference between two reference points, e.g. between points separated by a membrane.

A "steam raiser" produces vapor from a liquid, i.e. a steam raiser serves at generating a material in a gaseous phase. "Steam" and "vapor" are used in the same context throughout the description.

The terms "module", "device" or "apparatus" are used as synonyms. Also the terms "portion", "section", "channel", or "chamber" are used interchangeably and define a defined space or region that may be enclosed by a membrane, wall or housing.

It is understood that, in the following, only sections or parts of a desalination system are shown. In actual embodiments additional elements such as valves, tubes, conduits, accessories, fittings, pumps compressors and the like can be included.

Figure 1:
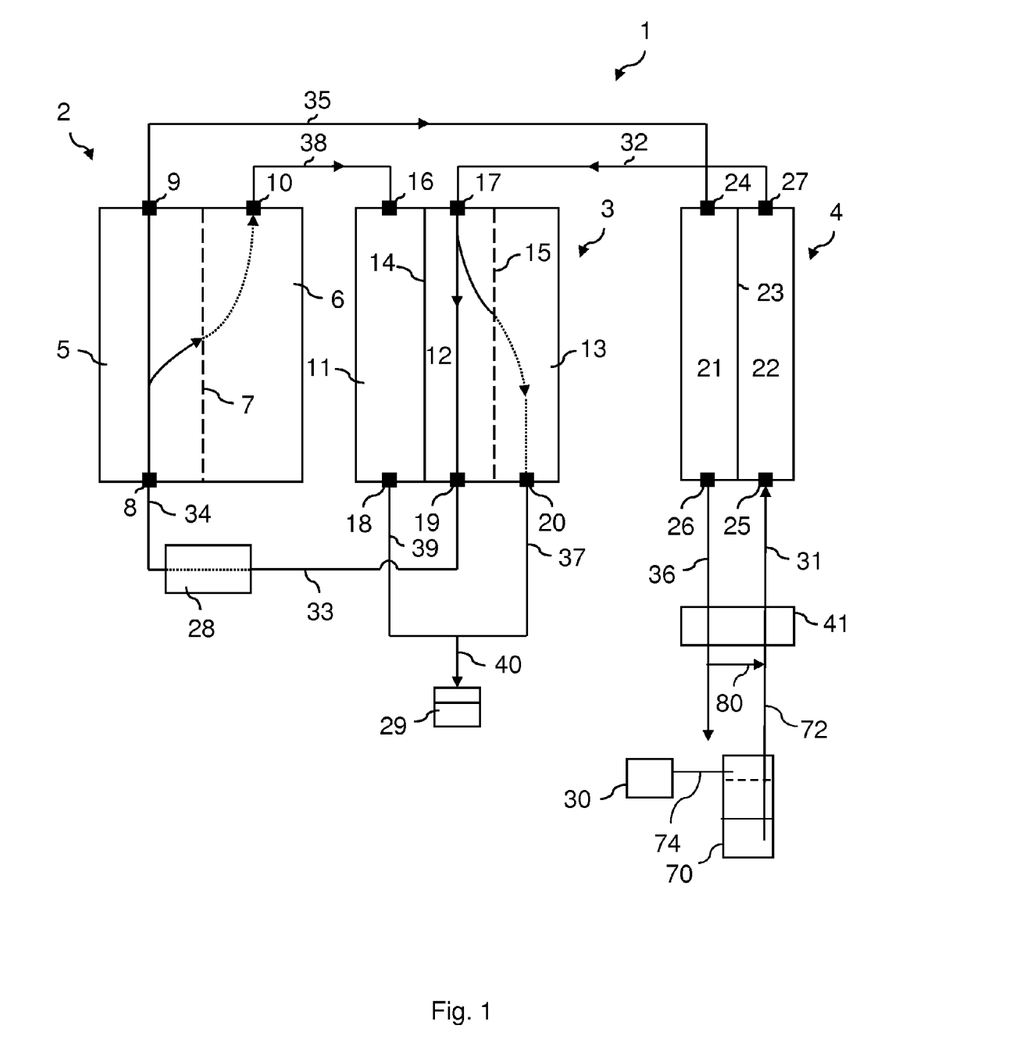
FIG. 1 shows a schematic diagram of a first embodiment of a desalination system.

FIG. 1 shows a schematic diagram of a first embodiment of a desalination system 1. The depicted desalination system 1 can be used to remove or separate a colloidal or dissolved matter from an aqueous feed solution or mixture at relatively low temperatures. For example, the desalination system 1 shown is used for purifying brackish or seawater into pure distillates and drinking water. The desalination system 1 is implemented to carry out a vacuum membrane distillation process.

The exemplary embodiment of a desalination system 1 comprises a steam raising device 2, a membrane distillation device 3 and a heat exchanger-boiler device 4. The devices 2, 3, 4 are, for example, implemented in a modular fashion such that similar elements can be easily attached to each other in order to upgrade or extend the desalination system 1.

The steam raising device or module 2 comprises a liquid section 5 and a steam section 6. The two sections 5 and 6 are separated by membrane systems 7. The membrane system 7 is, for example, a hydrophobic porous vapor-permeable membrane that allows water vapor to permeate but retains liquid water and dissolved ions such as salt ions due to its hydrophobic nature. The liquid section 5 has an inlet 8 and an outlet 9. The steam section 6 has an outlet 10. At an appropriate operating temperature, the feed liquid enters through the inlet 8 into the liquid section 5 and evaporates at the interface with a membrane 7. The vapor phase can then exit through the outlet 10 of the steam section 6. Concentrated liquid exits the liquid chamber or section 5 through the outlet 9.

The membrane distillation module 3 has three chambers or sections. The first section is a first steam or vapor section 11 which is adjacent to the liquid section 12. The liquid section and the first vapor section 11 are separated by a wall 14. A second steam or vapor section 13 is separated from the liquid section 12 by a membrane 15. The first steam section 11 has an inlet 16 and an outlet 18. The liquid section 12 also has an inlet 17 and an outlet 19. The second steam section 13 is provided with an outlet 20. The first steam section 11 and the liquid section 12 are in thermal contact through the wall 14.

The desalination system 1 also comprises a heat exchanger device 4 that has a first liquid section 21 and a second liquid section 22 which are separated by a wall 23. Both liquid sections 21, 22 have an inlet 24, 25 and an outlet 26, 27 respectively.

In FIG. 1, the additional arrows and lines 31-40 correspond to conduits, pipes or conducts for transporting either a liquid or vapor phase medium. The arrows attached to the lines 31-40 correspond to the flow direction. The outlet 27 of the liquid section 22 of the heat exchanger 4 is coupled to the inlet 17 of the liquid section 12 of the membrane distillation module 3. The outlet 19 of the liquid section 12 is coupled through a conduit 33 to a pump 28 delivering the respective liquid through another conduit 34 to the inlet 8 of the steam raising module 6. The outlet 9 of the liquid section 5 of the steam raising module 2 is coupled through a conduit 34 to the inlet 24 of the liquid section 21 of the heat exchanger-boiler 4. The outlet 10 of the steam section 6 of the steam raiser module 2 is coupled by a conduit 38 to the inlet 16 of the steam section 11 of the membrane distillation module 3. The outlets 18 and 20 of the two steam sections 11 and 13 of the membrane distillation module 3 are coupled by two conduits 37, 39 that merge into a pipe 40. The conduit 40 is coupled to a tank or container 29 for storing of the distillate. A modified compressor or vacuum pump 30 is coupled to a feed intake reservoir 70 through 74 and provides a partial vacuum condition, thus reducing the system pressure of the desalination system 1. Liquid feed is coupled into the desalination system 1 through the pipe or conduit 31. A feed liquid can, for example, come from a feed tank containing brackish or seawater 70. A brine discharge tube 36 is attached to the outlet 26 of the liquid section 21 of the heat exchanger 4. An additional heat exchanger 41 allows for heating the freshly input feed in conduit 31 by brine liquid that is to be discharged through conduit 36 and partially recycled through 80.

During the operation of the desalination system 1, the feed liquid, such as seawater, is heated such that the feed liquid is at least partially boiling in the liquid section 22 of the heat exchanger-boiler 4. This occurs partly by heating the feed liquid in the heat exchanger 41 and in the heat exchanger-boiler module 4. The preheated boiling feed is fed through conduit 32 to the liquid section 12 and further heated with heat transfered through the wall 14 from condensing vaporous permeate 11 stemming from vapor section 6 of the steam raiser 2. Boiling occurs at the wall 14 in contact with the liquid side together with evaporation of a part of the boiling feed in the liquid section 12 in contact with the membrane surface 15. Water vapor produced by boiling and evaporation in the liquid section 12 is diffused across the membrane 15, which is then collected at the outlet 20 by conduit 37.

The liquid feed is preheated through the heating device 28 which can be, for example, a solar heating device bringing the liquid feed to a temperature of around 60 to 70° C. The preheated liquid feed is fed into the inlet 8 by conduit 34. In the steam raiser module 2, the liquid feed is partially evaporated at the membrane surface 7 in contact with the liquid section 5 and discharged through the outlet 9, conduit 35 and fed into the heat exchanger-boiler module 4 at inlet 24.

The fluid flow can be assisted by additional pumps. The embodiment of the desalination system 1 includes several heat recovery measures. For example, the brine is used to preheat freshly fed liquid feed in the heat exchange module 4 and heat exchanger 41. Additionally, the evaporated permeate from the steam raiser 2 is used to heat the preheated feed from the heat exchanger-boiler module 4. This occurs in the membrane distillation module 3. As a result, the desalination system 1 is very energy and heat efficient (exergy efficient). The temperatures in the various sections and pressure differences are adapted such that the saturation pressure, in particular in the sections where the liquid feed is partially boiling, i.e. sections 12 and 22, correspond to the imposed temperatures. Additionally, valves may be implemented which are not shown in FIG. 1.

The disclosed embodiments of desalination systems and methods optimize efficient use and recovery of input heat where steam/vapor output 10 from steam raising device 2 is connected to the membrane distillation module through conduit 38 into steam/vapor chamber 16 and concentrate output from 5 connected to the heat exchanger-boiler module 4. The compact desalination system 1 comprises membrane distillation module 3 with chambers receiving boiling feed from the liquid section 21 of heat exchanger-boiler module 4 and steam/vapor condensation chamber 11 receiving steam/vapor from steam section 6 of steam raising device 2. The implementation of the compact desalination system 1 includes the heat exchanger-boiler device 4 receiving concentrated brine liquid from the steam raising device 2 and raw preheated feed via distillate holding tank 65 and brine discharge heat exchanger 41.

Condensing permeate from the steam section 6 in the first steam section 11 of the membrane distillation device 3 and simultaneously recovering the latent heat of condensation further induces flow boiling at the wall surfaces 14, 52 in contact with liquid sections 12, 51. The compact desalination system 1 combines a membrane distillation process with a flow boiling process including heat recycling by an efficient latent and sensible heat recovery from the condensing water vapor and concentrated brine liquid within the membrane distillation module and heat exchanger-boiler module.

FIGS. 2-5 show embodiments of steam raisers, membrane distillation modules and heat exchanger-boiler devices that may serve as building blocks for a purification system.

Figure 2:
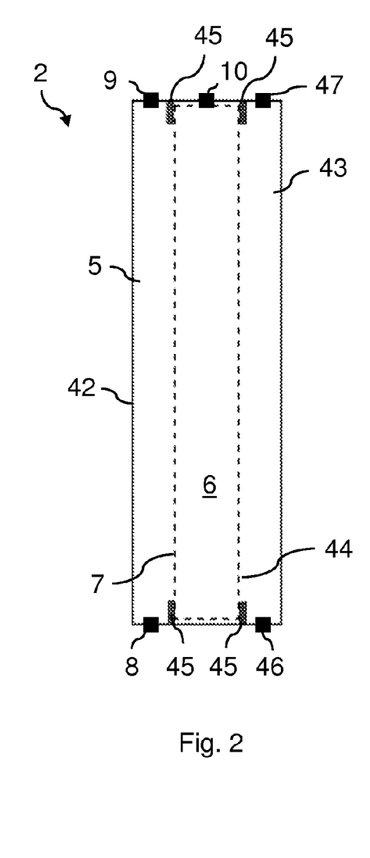
FIG. 2 shows a front view of a schematic diagram of an embodiment of a steam raiser module.
Figure 3:
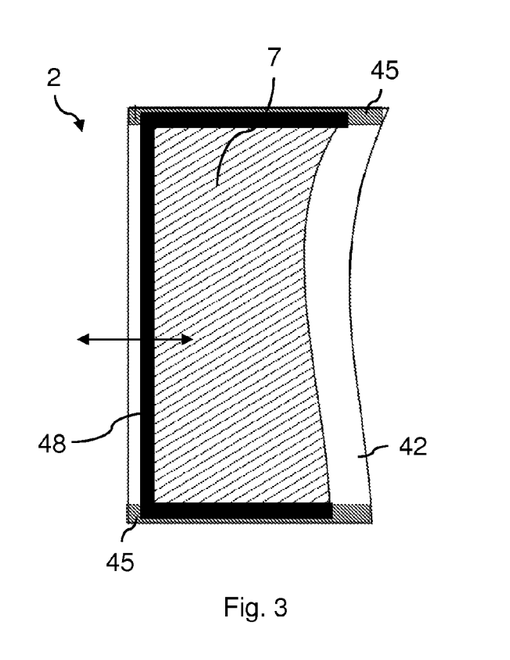
FIG. 3 shows a side view of a schematic diagram of an embodiment of a steam raiser module.

FIG. 2 shows a front view of an embodiment of a membrane module which is implemented as a steam raising device and FIG. 3 a side view of the same. The steam raising device 2 that can be used as a membrane distillation device comprises a casing 42. The casing 42 can be, for example, a polymer casing that may also comprise metal. One can contemplate of other appropriate materials for forming a housing. In order to fit membranes 7, 44 into the housing 42 and thereby creating several chambers 5, 6, 43, the membranes 7, 44 are each supported by a rigid frame 48. For example, the frame structure 48 can be made of metal. The membrane material, for example, includes PTFE materials having pore sizes of for example 0.20 to 0.45 µm. One may contemplate of other materials for the membranes and pore sizes. The membranes 7, 44 can be made of a porous hydrophobic material such as PTFE, PVDF or PP. The membranes 7, 44 are implemented to retain liquid, however are permeable to vapor. The housing 42 of the membrane module 2 has rectangular cross-sections, and the frame 48 for the membranes 7, 44 fits in such a cross-section. At sidewalls of the housing 44, guide rails 45 are placed. The guide rails serve for guiding and holding the framed membranes 7, 44, i.e. the support frames 48. One can speak of slots into which the membranes 7, 44 can be inserted and removed with ease for maintenance purposes.

In the configuration shown in FIGS. 2 and 3, two membrane structures 7, 44 divide the interior of the housing 42 into the first liquid section or liquid chamber 5 and the second liquid section or chamber 43. Both liquid chambers 5, 43 are provided with an inlet 8, 46 and an outlet 9, 47. Inlets 8, 46 and outlets 9, 47 are placed on opposite sidewalls respectively. Between the two membranes 7, 44, a steam chamber or steam section 6 is created. The steam chamber 6 has an outlet 10 from which vapor or steam can be discharged.

When operating the membrane modules 2, preheated liquid feed of up to 70° C. with heat exchange device 28 are fed into inlet 8, 46 to the outlet 9, 47 in the liquid chamber 5, 43. Due to a trans-membrane pressure gradient in vacuum chamber 6, gaseous water vapor permeates goes through the membranes 7, 44 and enters the steam chamber 6. In a desalination system, for example, hot salty water is fed in through the inlets 8, 46 as a liquid feed where evaporation takes place at the membrane pore surfaces of 7 and 44. Then, vapor permeate can be tapped off at the outlet 10 of the steam chamber 6. At the outlets 9, 47 of the liquid sections or chambers 5, 43, concentrated salt water can be received. As vacuum is created across the membrane 7, 44, with the use of a vacuum pump, the system pressure is reduced in comparison to conventional direct contact membrane distillation techniques.

Figure 4:
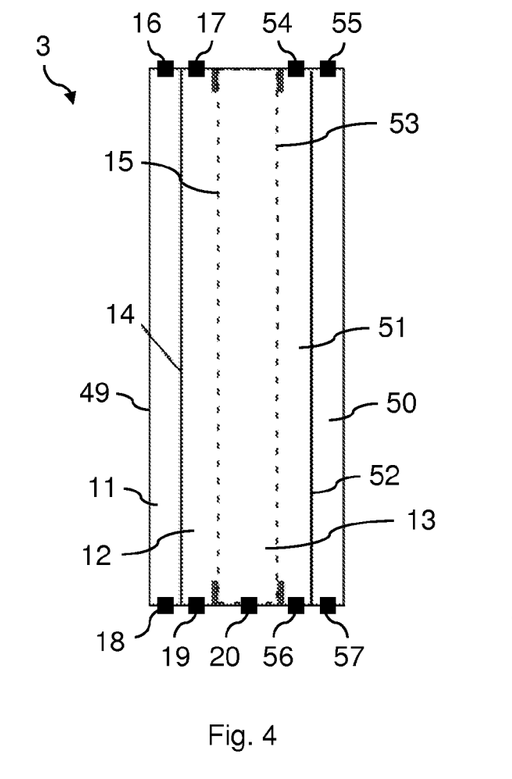
FIG. 4 shows a schematic diagram of an embodiment of a membrane distillation module.

A membrane module 2 as shown in FIGS. 2 and 3 can be employed as a steam raiser module, however, it may also be a part of a condenser module or a membrane distillation module. FIG. 4 shows an embodiment of a membrane distillation module 3. The membrane distillation module 3 comprises a housing 49 which is divided by rigid and impermeable walls 14, 52 and membrane structures 15, 53. Between the two membranes 15, 53, a vapor chamber or section 13 is created. The vapor chamber 13 has an outlet 20 where water vapor permeate can be tapped. Feed liquid near the boiling point is inserted into the liquid sections 12, 51 through inlets 17, 54 respectively. Concentrated feed liquid can be tapped off at outlets 19, 56. The membrane distillation unit 3 has a condenser function and a distiller function. In operation, vapor from, for example the steam raiser module 2, is inserted into the outer steam sections 11, 50 through inlets 16, 55. Although the walls 14, 52 are impermeable for liquid and gas, a heat exchange may occur between the two attached chambers 11 and 12, and 50 and 51 respectively. Hence, steam is cooled down and condenses at the walls 14, 52 in the outer chambers 11, 50. Basically, liquid distillate can be tapped off at outlets 18, 57. At the same time, the inserted feed liquid into the liquid chamber 12, 51 is heated to saturation conditions with feed boiling occurring on walls 14, 52 in contact with liquid feed in 12, 51. Water vapor produced will diffuse through membranes 15, 53 and discharged through outlet 20. Additionally, evaporation of liquid feed also takes place at the pore surfaces of membranes 15, 53 which then diffuses across the membrane 15, 53 to be tapped from outlet 20, thus increasing the water recovery ratio of the desalination system 1.

As shown and explained with respect to the configuration of the membrane modules of FIGS. 2 and 3, the membranes 15, 53 can be supported by a frame and held within the housing 49 through guide rails. One can form the condenser module or membrane distillation module 3 by inserting a membrane module as shown in FIG. 2 in a larger housing 49 to create the outer sections or channels 11, 54 for the vaporous medium to allow condensation of vapor to produce distillate.

Figure 5:
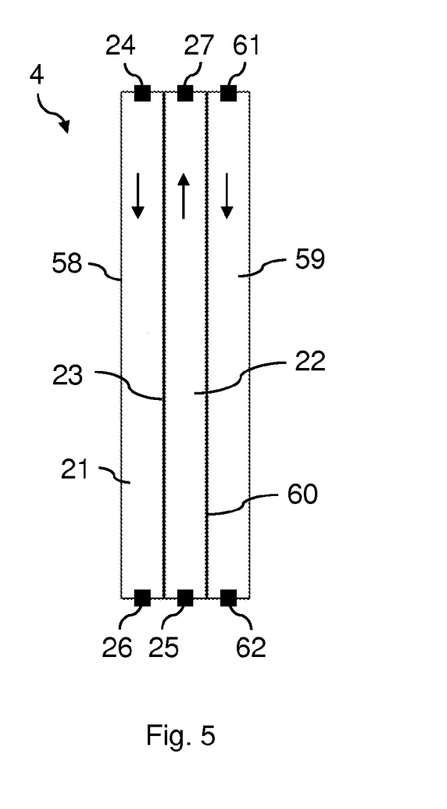
FIG. 5 shows a schematic diagram of an embodiment of a heat exchanger-boiler module.

FIG. 5 shows a heat exchanger-boiler device 4. The heat exchanger-boiler device 4 can also be used as a brine discharge module where the concentrated feed or brine is cooled while fresh feed is contemporaneously preheated to a higher temperature, e.g. close to its boiling point. A rigid casing or housing 58 is divided into the three chambers by walls 23, 60. The heat exchanging module or brine discharge device 4 can be operated in a counter-flow fashion such that brine liquid is fed into the outer liquid sections 21, 59 through inlets 24, 61 and released through outlets 26, 62. Heat is transferred through the walls 23, 60 to liquid feed flowing from an inlet 25 to an outlet 27 in a liquid section 22.

When combining the membrane module or steam raiser module 2 with a condenser module or membrane distillation module 3 and a brine discharge module or heat exchange module 4, an efficient heat recovery in a distillation or liquid purifying process can be achieved, re-using recovered waste heat for additional vapor production for higher water recovery process.

Figure 6:
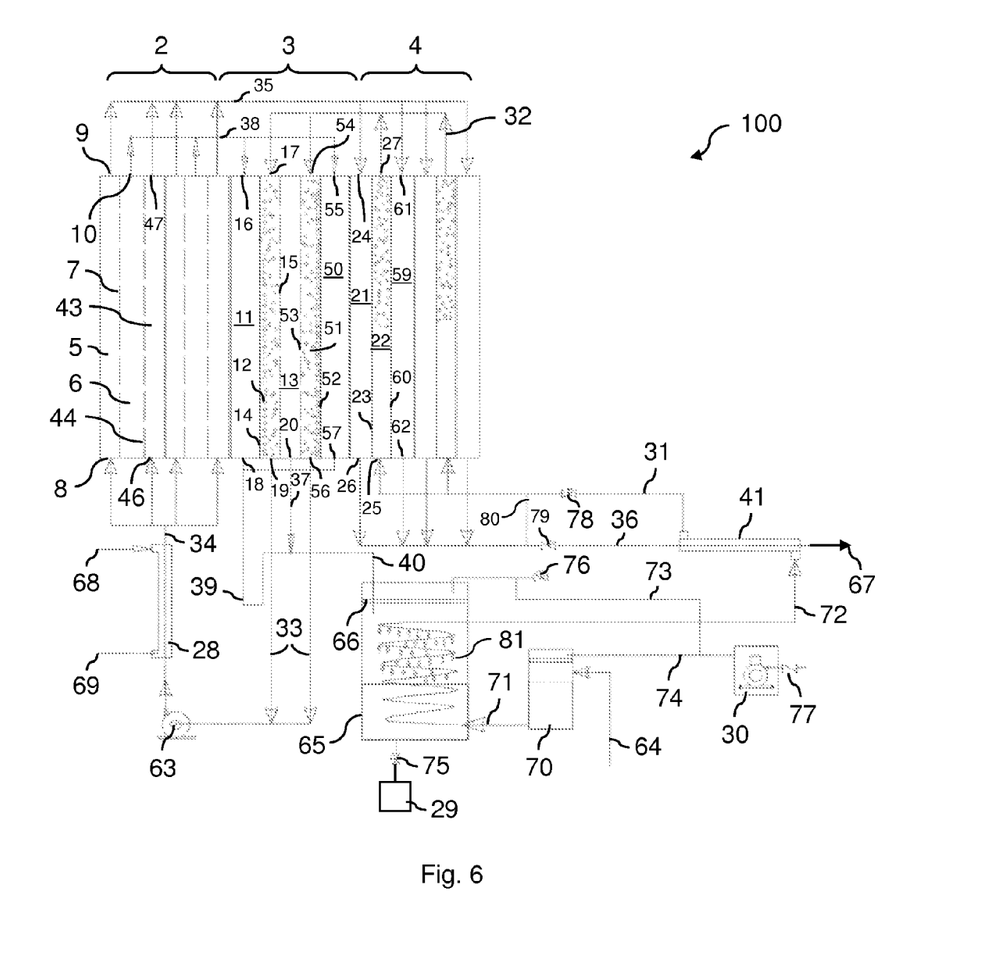
FIG. 6 shows a schematic diagram of a second embodiment of a desalination system.

FIG. 6 shows another embodiment of a desalination system 100 employing embodiments of the modules as shown in FIGS. 2 through 5. During the purification or desalination process, feed liquid, e.g. brackish water or seawater, is brought to the boiling point under sub-atmospheric conditions. The main heat source in the desalination system 100 is, for example, a heat exchanger 28 that is operated with solar heat or excess or waste heat from industrial facilities. For example, one may employ excess heat from a data center or the like. Within the distillation system, feed water or feed liquid is brought to a temperature where flow boiling occurs. Contemporaneously, the system pressure is adjusted such that for example the boiling point is between 40 and 65° C. By lowering the pressure below ambient pressure, low grade thermal energy can be used to boil and evaporate the liquid to be purified at the membrane interfaces.

To further enhance the energy efficiency of the desalination system 100, several heat recovery measures are implemented. The basic components of the desalination system shown in FIG. 6 are the steam raiser stage 2 comprising two steam raiser modules as shown in FIGS. 2 and 3, a distillation condensation stage 3 including a membrane distillation module as shown in FIG. 4 and a heat exchange modules forming a preheating and brine discharge stage 4. With respect to distillation capacity, additional modules can be accommodated into the system to increase distillate production. Due to the modular implementation, such modules can be combined to a compact block-like structure, e.g. a mini-scale vacuum membrane distillation system is provided.

When operating the system 100, first the liquid feed such as salty water is provided at a feed intake 64 and stored in a feed tank or reservoir 70. The feed tank or reservoir 70 is sealed from the outside ambient pressure.

A distillate holding tank 65 is coupled to outlets 18, 20, 57 of the membrane distillation module 3 through pipes or conduits 39, 37, 40. The distillate holding tank 65 comprises an integrated coil heat exchange tube 81 with liquid feed from conduit 71 flowing internally for feed preheating by the condensing vapor from conduit 40. The distillate holding tank 65 includes a demister 66 which can be a grid or the like. The relatively hot water vapor condenses on the coils of the distillate holding tank 65 where fresh feed liquid is fed into through conduit 71, thus preheating the fresh liquid feed from feed holding tank 70. As a result, preheated feed liquid can be tapped off and fed through a pipe or conduit 72 to another heat exchanger 41. Since the entire liquid flow system is under vacuum, i.e. having a pressure lower than ambient pressure, a discharge valve 75 is provided to intermittently discharge distillate through the valve 75 to a distillate tank or reservoir 29.

In order to achieve the low pressure environment, a vacuum pump or a modified compressor 30 with check valve 77 is coupled through conduits 73 and 74 to the feed holding tank 70 and to the distillate holding tank 65. A vacuum throttle valve 76 is coupled to the flow circuit for controlling and regulating the pressure inside the flow system.

Next, the preheated feed liquid from conduit 72 is fed to the second preheating exchanger 41. The heat is transferred from brine coupled out from the brine discharge module 4 at outlets 26, 62 and fed to the heat exchanger 41 by a conduit 36. Through the distillation process, the brine is at a significantly higher temperature than the preheated feed liquid from the first preheating in distillate holding tank 65. The temperature of the feed liquid in conduit 72 can be roughly 30 to 40° C.

After the heat exchanger 41, liquid feed in conduit 31 is passed through a flow throttle valve 78 and fed into the liquid sections 22 of the brine discharge or heat exchanger-boiler module 4. The liquid feed is heated from the hot brine to its boiling point. For example, the pressure and temperatures are arranged such that halfway through the liquid section 22, the onset of boiling occurs. Next, the boiling liquid feed together with the water vapor bubbles are fed into the membrane distillation module 3 by use of the conduit 32. In the membrane distillation module 3, water vapor entrained in the boiling feed 17, 54 permeates through the membranes 15, 53 and enters the vapor chamber 13 to be tapped at the outlet 20. Simultaneously, evaporation takes place at the liquid side membrane surface 15, 53 and additional vapor is diffused across membranes 15, 53 into vapor chamber 13.

The rest of the concentrated liquid feed, extracted of all water vapor is fed through the conduit 33 to a pump 63 and to the main heat exchanger 28. In the heat exchanger 28, the concentrated feed liquid is brought to a temperature between 60-70° C. and fed through inlets 8, 46 into the liquid sections 5, 43 of the steam raiser unit 2. Once again, evaporation takes place at the membrane surfaces 7, 44. Vapor diffusion takes place across the membrane 7, 44 and extracted through the outlet 10, and a conduit 38 to steam chambers 11, 50 of the membrane distillation module 3 to be condensed. The permeate, in its vapor phase condenses at the impermeable walls 14, 52 of the membrane distillation module 3 which one can also be called a condenser chamber. The mixture of vaporous and liquid distillate—assisted by gravitational forces are collected through the outlets 18, 57 and a conduit 37 into the distillate holding tank 65 comprising condensation coils 81. Water vapor condenses on the condensation coils 81 and the latent heat released is recovered to preheat the raw liquid feed from the feed holding tank 70, thus improving heat recovery.

In particular, the shown desalination system has efficient heat recovery first in the condensation chamber of the membrane distillation module 3, second in the heat exchanger-boiler module 4, third in the heat exchanger device 41, utilizing excess heat from the brine to be discharged, and fourth in the distillate holding tank 65 with condensation coils 81 where thermal energy from the condensing vapor and distillate is transferred to fresh liquid feed. As a result, the specific thermal energy consumption defined as the thermal energy consumption to produce a unit mass of distillate is reduced with respect to conventional distillation systems.

Rather than creating high feed water pressures as necessary in reverse osmosis systems for the separation process, a slightly reduced vacuum or lower pressure environment with respect to ambient pressure is employed in this thermal distillation process, i.e. a phase-change process. Low system pressure leads to a reduced boiling temperature such that feed boiling occurs in the feed exchanger-boiler module 4 and membrane distillation module 3. The temperature ranges, for example, between 20 and 70° C., with maximum feed temperature levels of 80-90° C. deemed feasible with the development of novel scaling-resistant membranes. At temperature levels below 70° C., membrane scaling should not occur. Thus, a reduced maintenance cost of desalination is achieved. In comparison to conventional membrane distillation techniques such as direct contact membrane distillation, air-gap membrane distillation and sweeping gas membrane distillation, larger pores can be used under vacuum membrane distillation conditions which then increases the water recovery ratio.

The proposed operation of the desalination system 100 achieves a flow boiling in the condenser and heat exchanger-boiler brine modules under sub-atmospheric conditions. Additionally, the recovery of latent and sensible heat is realized which leads to an improved overall system efficiency. Embodiments of the desalination system and the method for operation such are suitable for portable and compact vacuum membrane distillation systems. Applications may range from mobile applications, for example for camper vans, containerized bars, or vending machines to individual households. However, due to the high energy efficiency and scalability with respect to its modularized implementation, the vacuum desalination or purification system can also be implemented for space application where portable water is recovered from other affluent liquids.

The size and geometry of the modules can be adapted to the actual needs and boundary conditions of the application. The membranes used for the vacuum membrane distillation technique can have a porosity of 0.8 through 0.9, a tortuosity of 2 through 2.5 for PTFE membranes having a thickness of 50 through 200 microns. The pore size distribution can range between 0.2 and 0.45 microns. The modules can have a longitudinal extension, for example between 10 and 80 cm.

It is understood that the depicted exemplary embodiments can be modified without departing from the general concept depicted in this disclosure. In particular, the number and form of the modules, chambers, membranes, conduits etc. may vary according to the specific application of the purification system.

LIST OF REFERENCE CHARACTERS

1 desalination system
2 steam raiser module
3 membrane distillation module
4 heat exchanger-boiler module
5 liquid section
6 vapor/steam section
7 membrane
8 inlet
9, 10 outlet
11 steam/vapor chamber
12 liquid section
13 steam/vapor chamber
14 wall
15 membrane
16, 17 inlet
18, 19, 20 outlet
21, 22 liquid section
23 wall
24, 25 inlet
26, 27 outlet
28 heater
29 distillate collection tank/container
30 vacuum pump
31-40 conduit
41 heat exchanger
42 body/casing/housing
43 liquid section
44 membrane
45 guide rails
46 inlet
47 outlet
48 frame
49 body/casing/housing
50 steam/vapor chamber
51 liquid section
52 wall
53 membrane
54, 55 inlet
56, 57 outlet
58 body/casing/housing
59 liquid section
60 wall
61 inlet
62 outlet
63 liquid pump
64 feed intake 65 distillate holding tank
66 demister
67 brine discharge
68 heat source inlet
69 heat source outlet
70 feed holding tank
71-72 liquid flow conduit
73 74 vacuum conduit
75 distillate discharge valve
76 throttle valve
77 check valve
78 liquid throttle valve
79 brine throttle valve
80 brine recirculation conduit
81 condensation coil
100 desalination system

The invention claimed is:

1. A desalination system, comprising:
a steam raising device comprising a liquid section separated from a steam section by a membrane system;
a membrane distillation device comprising a first steam section separated from a liquid section by a wall, and a second steam section separated from the liquid section by a membrane system; and
a heat exchange device comprising a first liquid section separated from a second liquid section by a wall;
wherein the steam raising device, the membrane distillation device and the heat exchange device are implemented such that feed liquid fed into the second liquid section of the heat exchange device is heated by a brine liquid from the liquid section of the steam raising device, and such that permeate from the steam section of the steam raising device is condensed in the first steam section of the membrane distillation device, thereby heating heated feed liquid from the heat exchange device.

2. The system of claim 1, further comprising a heating device for providing heated feed liquid from the liquid section of the membrane distillation device to the liquid section of the steam raising device.

3. The system of claim 2, wherein the heating device comprises a heat exchanger coupled to a solar thermal source.

4. The system of claim 1, further comprising a compressor device for generating a pressure difference between liquid phase portions and gaseous phase portions in the desalination system such that a phase change from the liquid phase to the gaseous phase occurs at surface pores of a membrane.

5. The system of claim 1, wherein the desalination system is implemented to carry out a vacuum membrane distillation process.

6. The system of claim 1, wherein distillate is tapped at an outlet of the first steam section of the membrane distillation device and at an outlet of the second steam section of the membrane distillation device.

7. The system of claim 1, further comprising a second heat exchange device for transferring heat from the brine liquid from the first liquid section of the heat exchange device to feed liquid fed into the second liquid section of the heat exchange device.

8. The system of claim 7, further comprising a third heat exchange device for condensation of the steam from the first and second steam sections of the membrane distillation device and heating feed liquid to be fed into the second liquid section of the heat exchange device.

9. The system of claim 1, further comprising a pumping device for delivering feed liquid from the second liquid section of the membrane distillation device to the liquid section of the steam raising device.

10. The system of claim 1, wherein the desalination system is implemented such that the feed liquid, permeate, distillate and brine flow in a closed circuit coupled to the atmosphere by a brine-discharge valve and a throttle valve.

11. The system of claim 1, wherein the desalination system is implemented such that the feed liquid boils at least partially in at least one of the second liquid section of the heat exchange device and the liquid section of the membrane distillation device.

12. The system of claim 1, wherein the membrane system of the steam raising device and the membrane system of the membrane distillation device comprise a flat rectangular shaped membrane.

13. The system of claim 1, wherein at least one of the membrane system of the steam raising device and the membrane system of the membrane distillation device comprises at least two flat membranes spaced from each other.

14. The system of claim 1, wherein at least one of the membrane system of the steam raising device and the membrane system of the membrane distillation device comprises a membrane held by a support frame, and the support frame is placed into guiding rails at a body of the membrane distillation device or guiding rails at a body of the steam raising device.

15. The system of claim 1, wherein each of the steam sections and each of the liquid sections are box-like chambers.

16. The system of claim 1, wherein the membrane distillation device is arranged such that one of a permeate and a distillate is discharged by gravity.

17. The system of claim 1, wherein the desalination system comprises a plurality of steam raising devices, membrane distillation devices, heat exchange devices, or combinations thereof.

18. The system of claim 1, wherein the second liquid section of the heat exchange device is communicatively coupled to the first liquid section of the heat exchange device through a conduit to the first liquid section of the heat exchange device for re-circulating brine.

* * * * *